(12) United States Patent
Stepanov et al.

(10) Patent No.: US 8,474,484 B2
(45) Date of Patent: Jul. 2, 2013

(54) FLUID CONTROL

(75) Inventors: Eugene Vladimirovich Stepanov, Minneapolis, MN (US); Douglas P. Goulet, Hanover, MN (US); John Hunter, Rogers, MN (US)

(73) Assignee: IMI Vision Limited (GB)

( * ) Notice: Subject to any disclaimer, the term of this patent is extended or adjusted under 35 U.S.C. 154(b) by 922 days.

(21) Appl. No.: 12/087,255

(22) PCT Filed: Dec. 29, 2006

(86) PCT No.: PCT/GB2006/004934
§ 371 (c)(1),
(2), (4) Date: Sep. 30, 2008

(87) PCT Pub. No.: WO2007/074342
PCT Pub. Date: Jul. 5, 2007

(65) Prior Publication Data
US 2009/0217996 A1  Sep. 3, 2009

(30) Foreign Application Priority Data

Dec. 29, 2005 (GB) .................................. 0526545.9
Mar. 15, 2006 (GB) .................................. 0605144.5

(51) Int. Cl.
*F15D 1/02* (2006.01)
(52) U.S. Cl.
USPC ........................................ 137/625.33; 138/42
(58) Field of Classification Search
USPC ..................... 137/625.3, 625.33; 138/42
See application file for complete search history.

(56) References Cited

U.S. PATENT DOCUMENTS

| 1,243,134 | A | * | 10/1917 | Binckley | ...................... 137/485 |
| 3,513,864 | A | * | 5/1970 | Self | ................................ 137/14 |
| 3,954,124 | A | * | 5/1976 | Self | ................................ 138/42 |
| 4,079,754 | A | | 3/1978 | Porter | |
| 4,149,563 | A | | 4/1979 | Seger | |
| 4,267,045 | A | * | 5/1981 | Hoof | ............................. 210/322 |
| 4,327,757 | A | | 5/1982 | Weevers | |
| 4,938,450 | A | | 7/1990 | Tripp et al. | |

(Continued)

FOREIGN PATENT DOCUMENTS

| DE | G 82 11 777.2 | 3/1990 |
| EP | 1 566 585 | 8/2005 |

(Continued)

OTHER PUBLICATIONS

Written Opinion for PCT/GB2006/004934.

(Continued)

*Primary Examiner* — John Fox
(74) *Attorney, Agent, or Firm* — Stetina Brunda Garred & Brucker

(57) ABSTRACT

A valve trim for a pressure reduction valve containing a plurality of high hydraulic flow resistance flowpaths therethrough. Each flowpath comprises at least two inlets (208, 209) and at least one impingement zone (210) having two zone inlets (211, 212) and two zone outlets (213, 214). The zone inlets (211, 212) communicate with the inlets (208, 209) and are arranged substantially 180 degrees to one another. The two zone outlets (213, 214) are arranged substantially perpendicular to the zone inlets (211, 212) such that flow entering the two zone inlets (211, 212) mutually impinges on itself creating an area of high energy loss, and thereafter separates and exits through the zone outlets (213, 214).

24 Claims, 12 Drawing Sheets

U.S. PATENT DOCUMENTS

| | | | | |
|---|---|---|---|---|
| 5,112,503 A | * | 5/1992 | Raifman | 210/777 |
| 5,732,738 A | * | 3/1998 | Graham | 137/625.33 |
| 5,769,122 A | | 6/1998 | Baumann et al. | |
| 5,819,803 A | * | 10/1998 | Lebo et al. | 138/42 |
| 5,941,281 A | | 8/1999 | Baumann et al. | |
| 6,039,076 A | * | 3/2000 | Hemme et al. | 137/625.37 |
| 6,095,196 A | | 8/2000 | McCarty et al. | |
| 6,244,297 B1 | * | 6/2001 | Baumann | 137/625.3 |
| 7,320,340 B2 | * | 1/2008 | Bush et al. | 138/42 |
| 7,766,045 B2 | * | 8/2010 | Fagerlund et al. | 138/42 |
| 7,802,592 B2 | * | 9/2010 | McCarty | 138/42 |

FOREIGN PATENT DOCUMENTS

| | | |
|---|---|---|
| JP | 11248033 A | 9/1999 |
| JP | 2001519870 A | 10/2001 |
| JP | 2002540362 | 11/2002 |
| WO | WO 01/31242 | 5/2001 |

OTHER PUBLICATIONS

Japanese Office Action issued in relation to Japanese Patent Application No. 2008-548028. 8 pages. Feb. 6, 2012.

* cited by examiner

FLUID CONTROL

This invention relates to the control and reduction of fluid pressure in control valves, especially but not exclusively severe service valves for use in power industries and oil and gas wells.

The most widely used current technology in severe service valves utilises pressure letdown chambers consisting of one or more flow passages containing multiple orifice openings, labyrinths, or multiple abrupt angular turn passageways resulting in a staged pressure reduction. Alternatively, flow restrictions can be afforded by physically reducing the flow passage area through which the fluid passes. As the fluid flows through these physical restrictions the velocity is locally increased at the restriction outlets generating turbulence which dissipates energy and reduces the pressure.

In the afore-mentioned control valves, dissipation of the energy of the flowing fluid is effected by frictional drag through tortuous passages or by successive abrupt restrictions and expansions through smooth round passages. Both of these types of valve work well for clean fluid flows but in a number of applications the fluid flow will contain contaminants, for example solid particles or droplets of liquid (hereinafter collectively referred to as particles), which will cause the passages to erode quickly. This is especially prevalent in the tortuous flowpath type passage ways which relies on high friction, accelerating erosion and in expansion contraction valves as the contraction has an associated acceleration and the energy dissipated through the physical flow restrictions can result in physical damage or erosion to valve components if not controlled in a careful manner. The problem of erosion is particularly prevalent in well head choke valves, which are the primary shut-off/control valve atop an oil or gas well head. As this valve is immediately atop the well head there is no possibility of removing contaminants prior to them entering the valve.

The erosion rate ER in any location on a wall of the passageways is generally described by the following equation:

$$ER = C j_p f(\alpha) v_p^n$$

where $j_p$ is the mass flux of particles on the surface, $v_p$ is the particle impact velocity; the angle function $f(\alpha)$, the proportionality coefficient C and the velocity exponent n are characteristic to the particle-material pair and determined experimentally. For brittle materials, the angle function decreases with the impact angle; for ductile materials, it has a maximum at 20-30°. The velocity exponent is generally near 2, and, since the mass flux is the product of the particle concentration and the normal component of the impact velocity, one can arrive at a strong dependence of the erosion rate on the particle velocity that is close to the power of three.

Since particles follow the fluid flow in the channel, the order of magnitude of the particle velocities is determined by the fluid velocity. Minimizing the latter means decreasing the specific flow capacity, Cv per unit of the channel cross-sectional area, Cv/A. As the current designs are not particularly space efficient in their flow paths, and some of the highest eroded valves are well head choke valves which need a high Cv, reducing the erosion by using known technology decreases the total flow through the valve restricting the output of the well. It would therefore be advantageous to have a flowpath that gives a high flow resistance yet which is highly compact such that a larger number of flowpaths can be arranged into the same space to compensate for the reduced flow through each channel, thereby maintaining the same or even increasing the total flow through the valve and simultaneously reducing erosion due to the reduced velocity through each passageway.

An alternative method of pressure reduction is the dissipation of energy through a combination of frictional loss and mutual fluid impingement. U.S. Pat. Nos. 4,567,915 of Valtek Incorporated and 3,520,864 of Richard Self both disclose valve trims in which the fluid flow impinges on itself. Neither of these designs however is suitable for high erosion applications. Referring to the '915 patent, the trim has a number of small annular passages which open into a small expansion chamber. The passages are required to be of small cross sectional area as the main means of pressure loss in this valve is the frictional losses in the flowpath. Reducing the cross-sectional area of the passageways increases the ratio of the passage surface to volume. This increases the probability of an accelerated particle contacting the flowpath wall thereby accelerating the erosion rate. In addition, small orifice passageways are prone to becoming blocked by large particles which can occasionally appear in the flow stream. Self's patent has flowpaths which impinge upon one another but the main cause of pressure loss is friction due to the tortuous path through which the fluid flows resulting in high erosion rates. Although in Valtek's patent the impingement in the expansion chamber may reduce particle energy that locality, in neither of the above mentioned patents does the inclusion of impinging fluid flowpaths significantly reduce erosion and neither would be suited to a high erosion environment. In particular the design of neither of the flowpaths is suited to being confined in a small area.

The present invention attempts to mitigate the above problems by providing a trim for a control valve that has an increased resistance to erosion.

According to the present invention there is provided a valve trim for a pressure reduction valve containing a plurality of high hydraulic flow resistance flowpaths therethrough, each flowpath comprising at least two inlets and at least one impingement zone, said impingement zone and having two zone inlets in communication with the flowpath inlets and arranged substantially 180 degrees to one another and two zone outlets substantially perpendicular to the zone inlets such that flow entering the two zone inlets mutually impinges on itself creating an area of high energy loss, and thereafter separates and exits through the zone outlets.

Preferably the zone inlets and outlets form an X-shaped flowpath, the X-shaped flow path preferably being in a plane perpendicular to the general direction of flow through the trim.

In a flowpath of the invention the fluid flow changes direction in the impingement zones by impinging on itself rather than being constrained by solid walls. The particles entrained in the flow therefore also change direction, in the impingement zones, without substantially impinging on the walls whereby their energy is dissipated resulting in reduced, subsequent, erosion of the trim wall. The flowpath is arranged in such way that, as the particle energy is dissipated, the particles only have a limited distance in which to accelerate prior to their next point of impact. Ideally the impingement of the flow from the two inlets would be their first impact after entering the passageways; practically, however, it is necessary to turn the flow from the two inlets through 90 degrees to enable them to impinge upon one another. Preferably the two inlets turn through 90 degrees and then immediately impinge upon one another. The flow then immediately separates again into two zone outlet flows.

In a preferred arrangement the two zone outlet flows turn back on themselves through 180 degrees and impinge on each other a second time at a second impingement zone, thereby further dissipating energy. This second impingement zone is preferably also has an X-shaped flowpath and functions the same as the first zone, however an in an alternative arrangement the second impingement zone has a T-shaped flowpath having the two outlets of the first zone entering the T at 180 degrees to one another, impinging on one another and then exiting together through a single outlet.

Preferably the flow exits the trim after the second impingement. Where the second impingement has x-shaped flow, the flow changes direction through 90 degrees before exiting the trim and, where the second impingement zone has a T-shaped flowpath the combined flow can exit directly out of the leg of the T.

Because the fluid flow impingement zones serve also as 90° turning points, two different energy loss mechanisms (impingement and torturous path) are combined on the same plane. In terms of the number of turns, in a volume $(2.54 \text{ cm})^3$ (one cubic inch) the structure is enables a flowpath $(6.35 \text{ mm})^2$ (0.25 inches square) gives a hydraulic flow resistance equivalent to two 6-turn channels. In comparison it is only possible to create two 4-turn flowpaths of the same size using just 90 degree turns in the same volume. The extra 2 turning points are the mutual jet impingement zones. Accordingly, the hydraulic resistance of a flowpath of the valve trim of the current invention is higher, and Cv per flowpath is lower, than that of the 4-turn conventional flowpath with the same inlet orifice and the inlet-to-outlet distance. Thus, implementing 180 degree impingement zones into the design according to the present invention results in flow paths of higher hydraulic resistance, i.e. able to reduce pressure, or to reduce flow velocity at given pressure differential, over a shorter distance, in a lower volume of valve trim.

Regarding reduced erosion the advantages of utilizing 180 degree flow impingement are two-fold. Firstly, as described above, it increases hydraulic resistance thereby decreasing the fluid velocity and, as a result, decreasing the particle velocities. Approximately, a 25% decrease in particle velocities causes about 2.5 times decrease in the erosion rate at the first impingement of the particles on the wall of the flow passage. Secondly, particles mainly hit the flow passage walls at 90° turning points where, because of the particles inertia, they deviate from the fluid path. In the impingement zones of the flowpath of the invention, the flow turns without the use of solid constraints, and particles change the direction of their velocity by decelerating against the opposite flow stream instead of hitting a wall. Accordingly, erosion in these zones is dramatically lower than a trim having purely physically constrained 90° turning points.

In an alternative arrangement where both first and second impingement zones have X-shaped flowpaths, the flowpath may be repeated in series with the outlets of one zone becoming the inlets of the next.

The impingement zones create a high hydraulic resistance and remove energy from any erodent entrained in the gas flow.

Preferably the distance between first and second zones is minimized to reduce the acceleration length of the erodent between impingements. In a preferred arrangement each outlet flow from the first zone divides into two split paths to reduce the particle velocity as it changes direction and then the split paths rejoin at a third impingement zone immediately prior to the second impingement zone, again impinging the erodent carried by the flow on itself to dissipate their energy before the two outlet flows impinge upon one another at the second zone.

Preferably the flowpaths are arranged in a generally radial fashion around the trim with the inlets on the outside circumference of the trim and the outlets on the interior surface of the bore.

In one preferred arrangement adjacent flowpaths through the trim share a common section such that the zone outlets from the first impingement zones of adjacent flowpaths impinge on one another substantially at 180 degrees at a common impingement zone, having a T-shaped flowpath, and then flow together for a short distance before splitting to flow to second impingement points of the respective adjacent flowpaths.

In another preferred arrangement adjacent flowpaths through the trim share a common section such that the zone outlets from the first impingement zones of adjacent flowpaths impinge on one another substantially at 180 degrees at a common impingement zone having an X-shaped flowpath, one zone outlet of each of said two adjacent flowpaths forming the zone inlets to the common impingement zone, the inlets impinging on each other and then immediately separating into two intermediate flows, the two intermediate flows turning trough 180 degrees to impinge upon one another at a further impingement zone also having an X-shaped flowpath and then splitting to form an inlet to second impingement zones of each of two adjacent flowpaths.

Preferably the valve trim is constructed of a number of flat disks, stacked on top of one another, each having some legs of the flowpath therein. Preferably, the flowpaths of the valve trim are constructed from a plurality of flat disks, each having a number of omissions therein, such that when the said plurality of disks are stacked on top of one another the omissions together form the flowpaths. In one preferred arrangement the trim is made of a plurality of sets of three disks, each set of three disks defining a radial array of flowpaths, with a solid plate between each set of three disks, maintaining the arrays of flowpaths independent of one another in a vertical direction. In an alternative arrangement the sets of disks are stacked on top of one another without any solid plates therebetween thereby connecting subsequent flowpaths in the vertical direction. Preferably the disks are made of a material which resists erosion, for example carbamide.

The at least two inlets of the flowpath are preferably at least partially tapered along their length, the cross-sectional size of the inlets reducing along the direction of flow through the flowpaths. Preferably, the at least two inlets of the flowpath are filleted on their inlet edges such that, in the region of the fillet, the cross-sectional size of the inlets reduces along the direction of flow through the flowpaths.

Alternatively, the valve trim comprises a plurality of flat disks, each having a plurality of apertures provided through it, each aperture forming a leg of a flowpath through the valve trim, the disks being stacked on top of one another, such that a first aperture in a first disk is at least partly aligned with a first aperture on a second, adjacent disk to thereby form the flowpath through the valve trim.

Preferably, at least one aperture on at least one disk comprises an inlet aperture for receiving fluid through an inlet end into the valve trim flowpath. The inlet aperture preferably comprises a tapered inlet section at its inlet end, the cross-sectional size of the inlet aperture reducing along the inlet section from the inlet end. The inlet section may be frusto-conical in shape, giving the inlet section curved profile at its inlet end. Alternatively, the inlet section may generally have the shape of a truncated square pyramid.

Alternatively, the inlet end of the inlet aperture may be non-rectangular in shape. The inlet end of the inlet aperture may be generally octagonal in shape or may take the shape of a rectangle having radiussed corners.

Shaping the inlet end of the inlet aperture in these ways ensures that the inlet end does not have any sharp angles, thereby reducing the occurrence of eddies in the flow of fluid through the inlet end of the inlet aperture and consequently minimizing the concentration of particles within the fluid towards the central region of the fluid flow.

Specific embodiments of the invention will now be described, by means of example only, with reference to the accompanying drawings in which.

Figure 11:
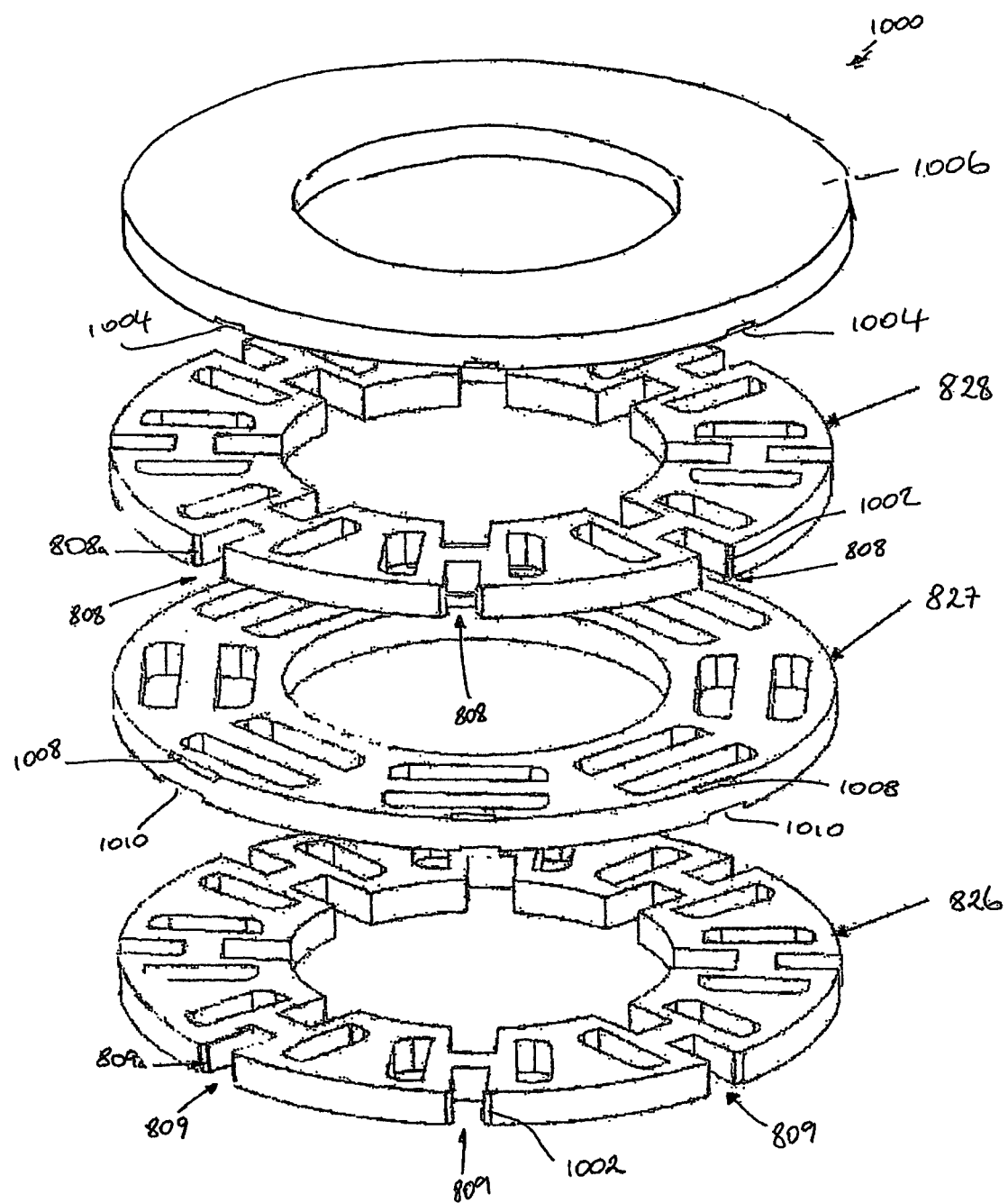
FIG. 11 shows an exploded view of three disks and a cover disk of a valve trim according to a fifth embodiment of the invention.
Figure 13:
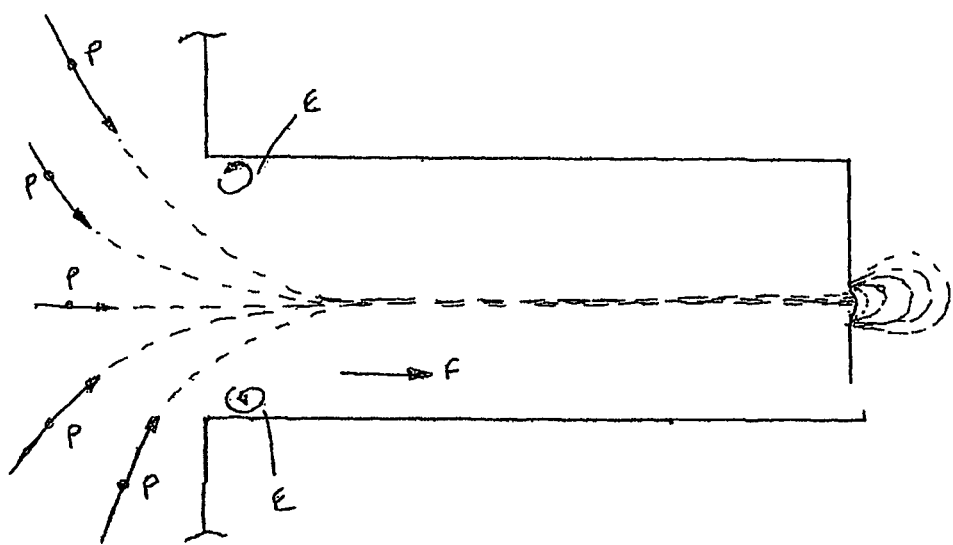
Figure 14:
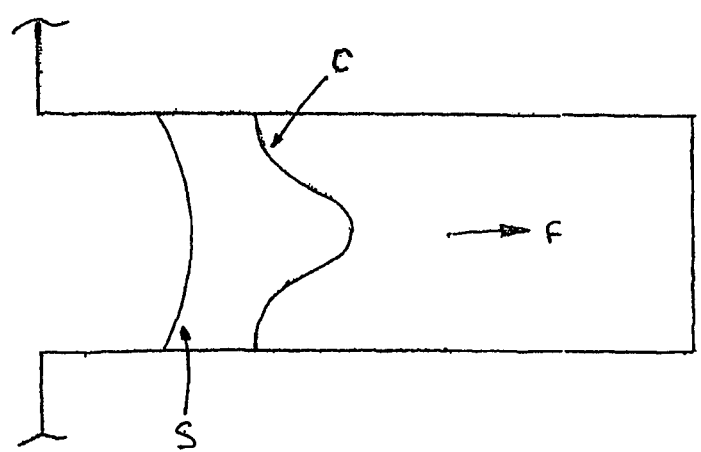
Figure 15:
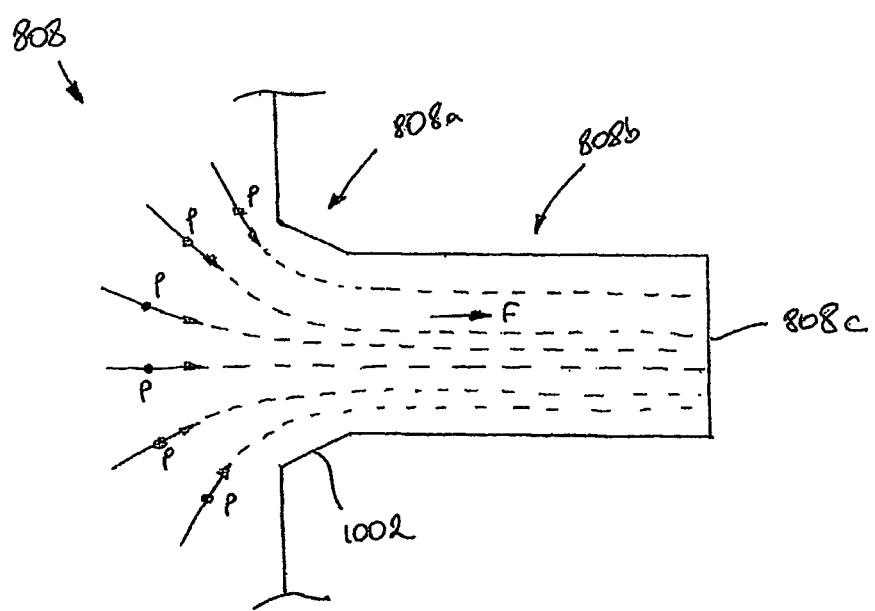
Figure 16:
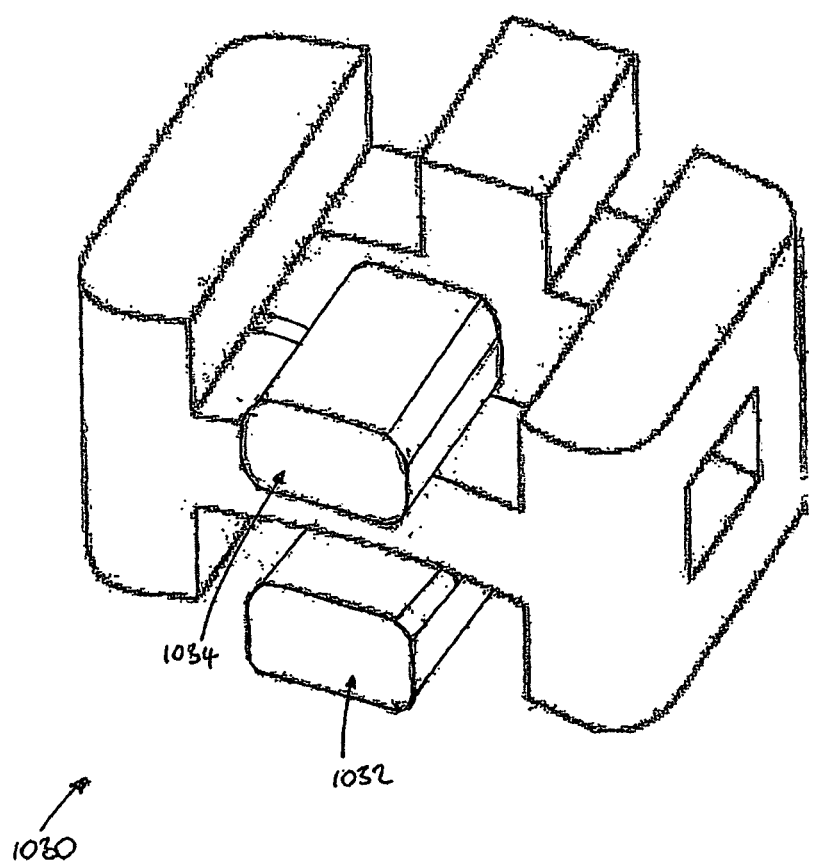

FIG. 13 of is a diagrammatic illustration of the flow of particles within a fluid flow through a valve trim as common in the art;

FIG. 14 illustrates the particle density and fluid speed of the fluid flow of FIG. 13;

FIG. 15 is a diagrammatic illustration of the flow of particles within a fluid flow through the valve trim of FIG. 11; and FIG. 16 is a diagrammatic illustration of a flowpath created by a valve trim according to a seventh embodiment of the invention.

Figure 1:
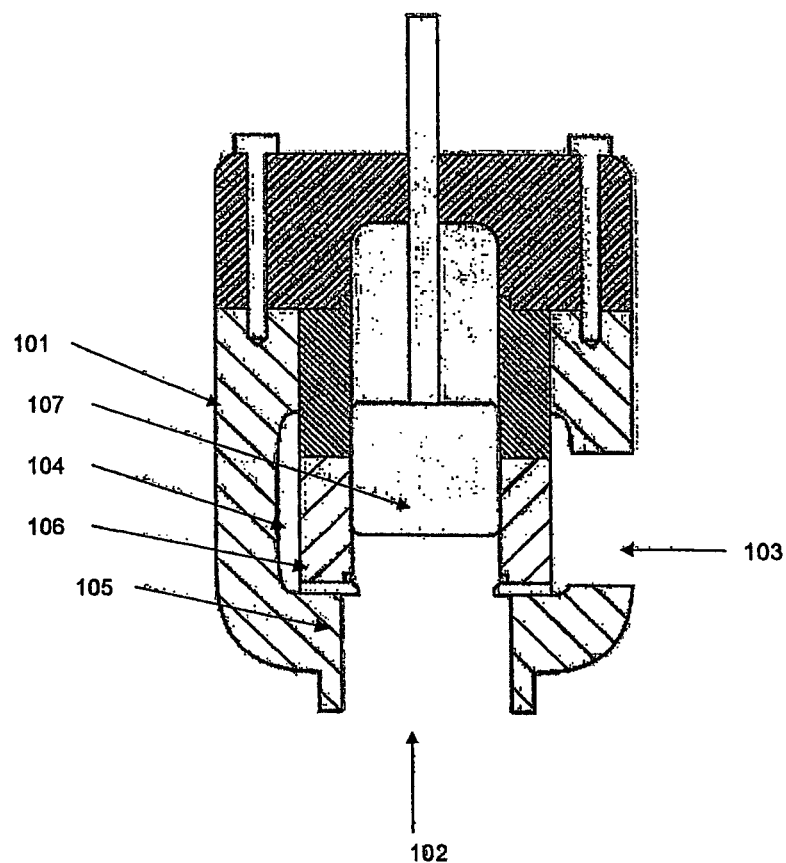
FIG. 1 is a vertical section showing the construction of a control valve incorporating a valve trim as common in the art.

Referring to FIG. 1 an example of a valve trim in a fluid control valve is shown as common in the art comprising of a valve body 101 with a inlet 102 and outlet 103 in fluid communication with one another via a central chamber 104 containing seat ring 105, valve trim 106 and plug 107. When the valve plug 107 sits on the valve seat ring 105 no flow is permitted to pass through the valve. As the plug 107 lifts up in a controlled movement flow is allowed to enter the valve through inlet 102, pass through the valve trim 106 which reduces the fluid pressure and out of outlet 103.

Figure 2:
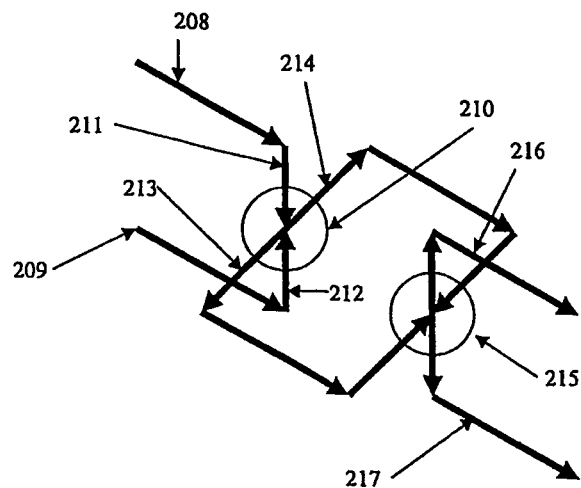
FIGS. 2 to 7 show flowpaths with impingement zones for use in valve trims according to first to sixth embodiments of the invention.

Referring to FIG. 2 a diagram of a high hydraulic resistance flowpath for use in a valve trim according to a first embodiment of the invention is shown. The flowpath has two inlets 208, 209 which turn through 90 degrees and impinge on each other at 180 degrees at a first impingement zone 210 having an X-shaped flowpath. The flow then separates and exits the impingement zone 210 through zone outlets 213, 214 perpendicular to the inlets 211, 212 to the zone 210. The zone outlets 213, 214 turn through 180 degrees, the fluid flow in each of them impinging upon one another in a second impingement zone 215. The outlets 216, 217 of the second impingement zone 215 turn through 90 degrees and then exit the trim. As the flow impinges on itself at the first zone 210, any particles in the flow impinge on one another and in doing so firstly act to erode on one another breaking down into smaller and therefore lighter particles, and secondly their velocity is reduced. The erosion of the valve trim is dependant on the momentum with which particles in the fluid flow impact on the trim material. The momentum is a factor of both the mass and the velocity of the particles so, in addition to eroding one another as opposed to eroding the trim walls, impinging the flow reduces erosion by reducing the momentum of the particles. Impinging the flow at 180 degrees results in the maximum effect for reduced erosion as a greater part of the velocity vector is dissipated in the impact of the particles against one another. Separating the flow into two outlets 213, 214 immediately after the impingement maintains the cross sectional area of the flowpath, preventing too great an acceleration.

Figure 3:
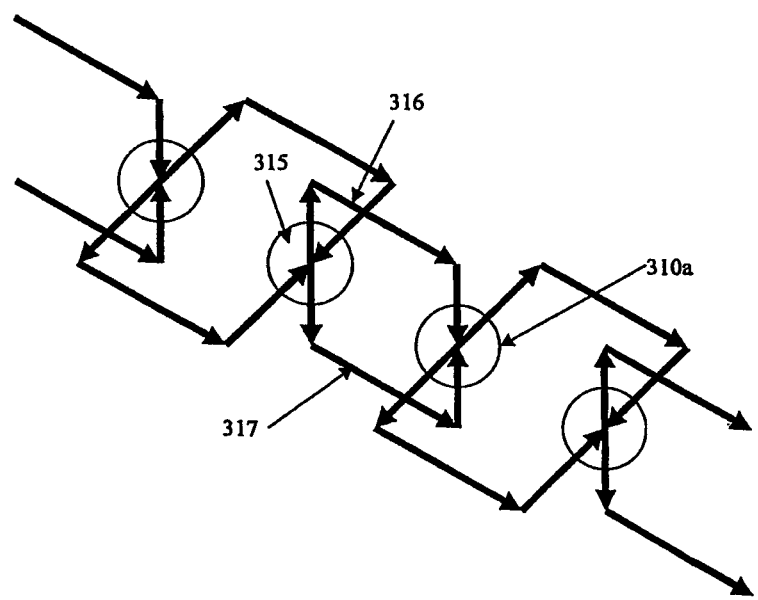

Referring to FIG. 3 a diagram of a high hydraulic resistance flowpath for use in a valve trim according to a second embodiment of the invention is shown. The flowpath essentially the same as shown in FIG. 1 but is repeated in series to create a multi stage flowpath such that the outlets 316, 317 from second impingement zone 315 become the inlets for the first impingement zone 310*a* of the second stage. The flow path of a two stage trim is shown in FIG. 3 but it will be appreciated that the trim may have any number of stages.

Figure 4:
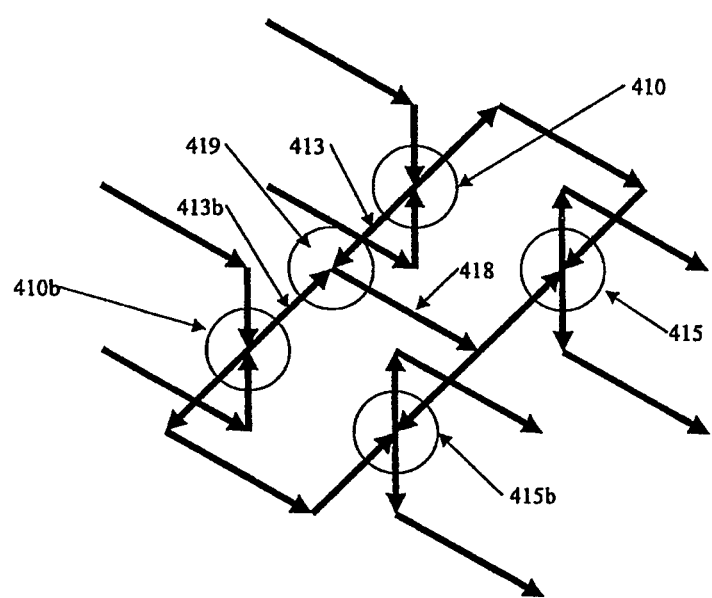

Referring to FIG. 4 a flowpath arrangement for use in a valve trim according to a third embodiment of the invention is shown. In this embodiment adjacent flowpaths through the trim share a common section 418 such that the zone outlets 413, 413*b* from the first impingement zones 410, 410*b* of adjacent flowpaths impinge on one another substantially at 180 degrees at a common impingement zone 419 with a T-shaped flowpath, and then flow together for a short distance before splitting to flow to second impingement points 415, 415*b* of the respective adjacent flowpaths. The additional impingement zone 419 in this arrangement increases the hydraulic resistance of the flowpath and removes an extra erosion point (point of fluid impingement upon the material of the trim) and replaces it with a fluid on fluid impingement. Although two flowpaths are shown in FIG. 4 it will be understood that multiple adjacent flowpaths around the diameter of a valve trim can be joined together by a subsequent common section.

Figure 5:
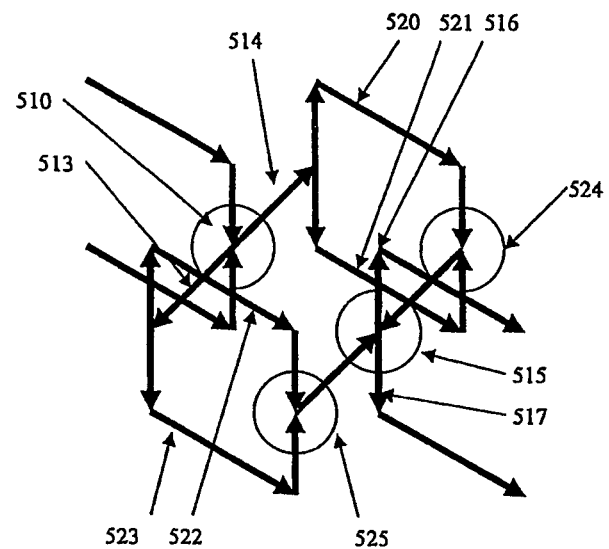

Referring to FIG. 5 a flowpath for use in a valve trim according to a fourth embodiment of the invention is shown. The flowpath of this embodiment is substantially the same as the flow path of FIG. 2, with the following modifications. The erosion caused by particles in the flow is dependent on their velocity and their velocity is dependent on the length of the flowpath over which they can be accelerated by the flow passing therethrough. In the arrangement shown in FIG. 2 there is a relatively long flow section between the first and second impingement zones (210, 215 of FIG. 2). The flowpath shown in FIG. 5 provides an improvement over the flowpath of FIG. 2 since it splits each outlet 513, 514 of the first impingement zone 510 into two parallel flows 520, 521 and 522, 523 thereby doubling their cross sectional area and reducing the velocity of the fluid passing through each. The pairs of parallel flows turn through 90 degrees towards one another and impinge at 180 degrees on one another at respective impingement zones 524, 525 having a T-shaped flowpath and exit each zone 524, 525 to flow towards the impingement zone 515 where they impinge for a final time and then exit perpendicular to the flow entering the zone 515. The two outlets 516, 517 then turn through 90 degrees before exiting the valve trim.

Figure 6:
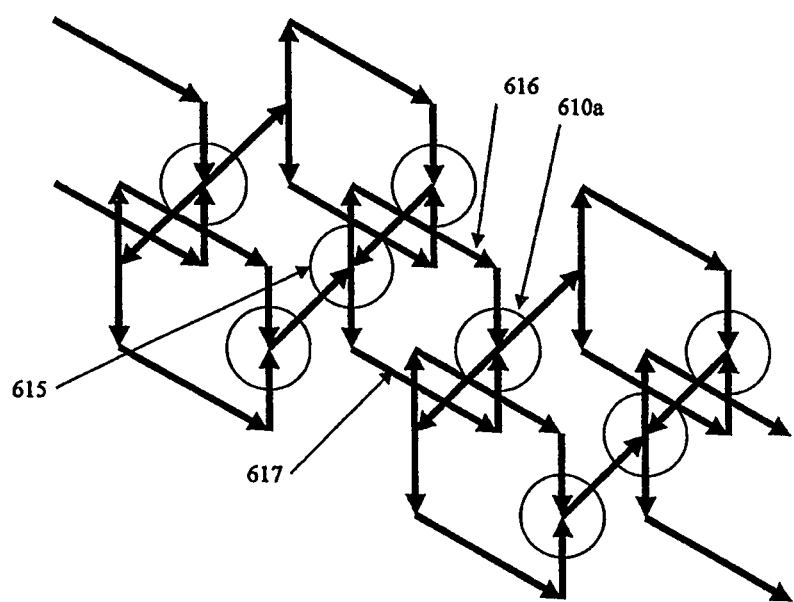

FIG. 6 shows a high hydraulic resistance flowpath for use in a valve trim according to a fifth embodiment of the invention. The flowpath of this embodiment is essentially the same as shown in FIG. 5 but is repeated in series to create a multi stage flowpath such that the outlets 616, 617 from second impingement zone 615 become the inlets for the first impingement zone 610*a* of the second stage. The flowpath for a two stage trim is shown in FIG. 6 but it will be appreciated that the trim may have any number of stages.

Figure 7:
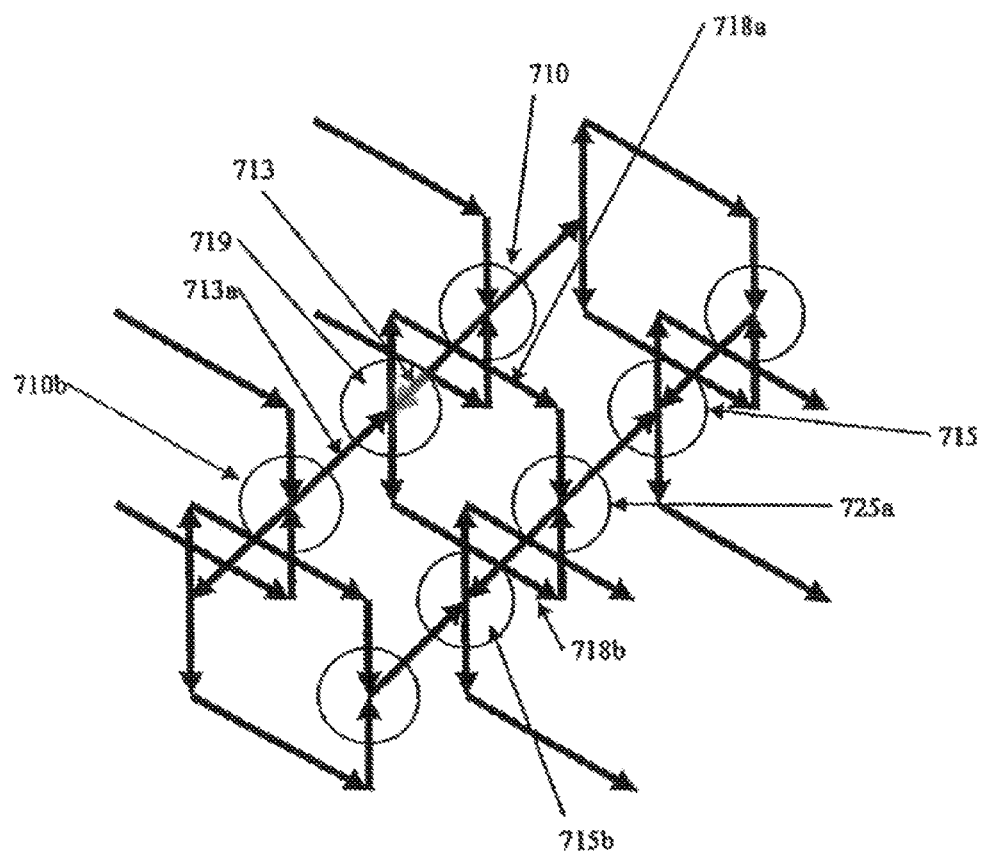

Referring to FIG. 7 a flowpath is shown for use in a valve trim according to a sixth embodiment of the invention. In this arrangement adjacent flowpaths through the trim share a common flow sections 718*a*, 718*b* such that the zone outlets 713, 713*b* from the first impingement zones 710, 710*b* of adjacent flowpaths impinge on one another substantially at 180 degrees at a common impingement zone 719 having an X-shaped flowpath and then immediately separate into two common flow sections 718*a* and 718*b*. The common flow sections 718*a* and 718*b* then turn through 180 degrees to impinge at 180 degrees to one another at a impingement zone 725*a*, having an X-shaped flowpath, immediately separating and exiting the zone 725*a* perpendicular to the flows 718*a*, 718*b* and flow to the final impingement points 715, 715*b* of the respective adjacent flowpaths. Although two adjacent flowpaths are shown in FIG. 7 it will be understood that multiple adjacent flowpaths around the diameter of a valve trim can be joined together by a subsequent common section.

Figure 8:
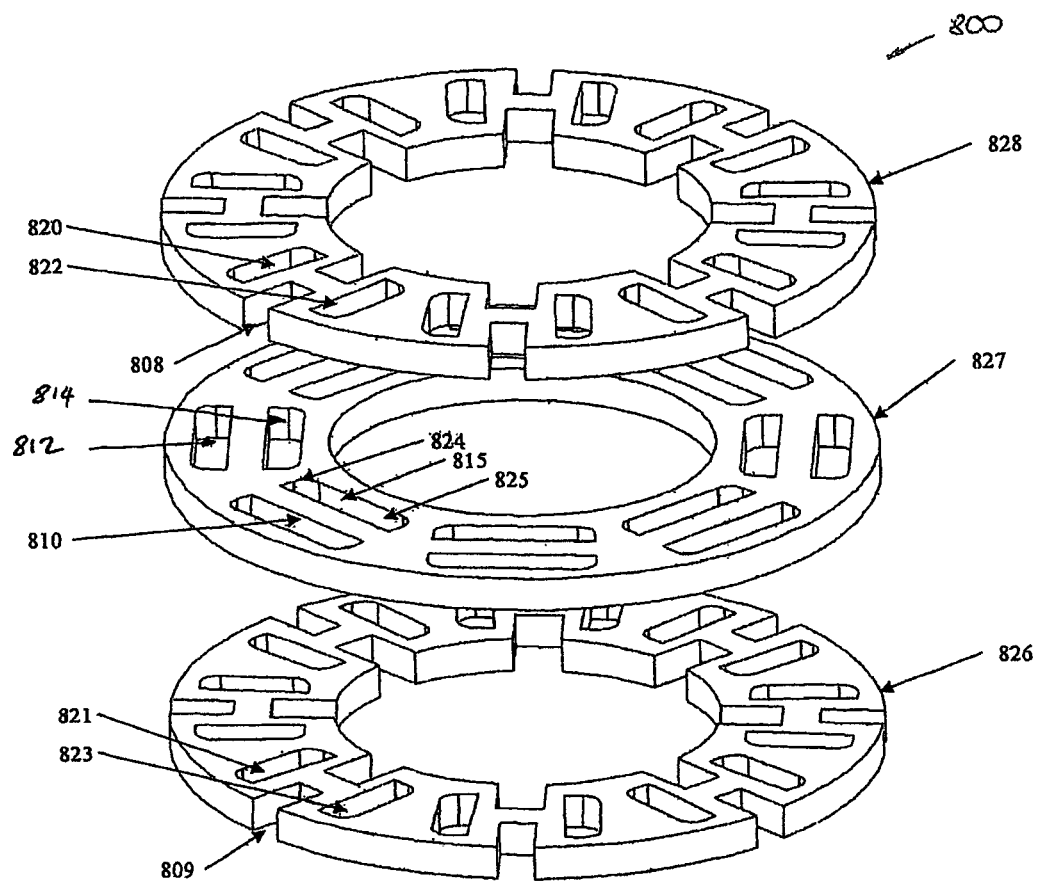
FIG. 8 shows an exploded view of a set of three disks of the valve trim of the fourth embodiment which together form the flowpath shown in FIG. 5.

FIG. 8 shows an exploded view of part of a valve trim 800 according to the fourth embodiment of the invention, for implementing the flowpath of FIG. 5. The valve trim 800 comprises a number of individual elements 826, 827 and 828, all producible using simple manufacturing techniques. The elements are disks made of carbamide and are pressed into their respective shapes prior to being hardened. Each disk 826, 827 and 828 has eight sets of apertures provided through it. Each set of apertures in the top disk 828 comprises an inlet aperture 808 and two flowpath apertures 820, 822. Similarly, each set of apertures in the bottom disk 826 comprises an inlet aperture 809 and two flowpath apertures 821, 823. Each set of apertures in the middle disk 827 comprises two impingement apertures 812, 814 which are orientated 90 degrees with respect to the flowpath apertures 820, 821, 822, 823 in the top and bottom disks 828, 826.

The inlet apertures 808, 809 in the top and bottom disks 828, 826 form inlet paths 808, 809 which undergo 90 degree turns as they enter the middle disk 827. The first impingement aperture 812 in a set forms an impingement zone 810, having an X-shaped flowpath, which occurs as the two inlets come together in the middle disk 827 where they impinge on one another and then separate in a horizontal direction. Each separated flowpath then splits into upper 820, 822 and lower 821, 823 apertures in the upper 828 and lower 826 disks respectively, the separated flowpaths coming back together and impinging on one another in the middle disk 827 at T-shaped impingement zones 824, 825, within the second impingement aperture 814 and then flowing towards one another and impinging a final time on one another at impingement zone 815, also in the second impingement aperture 814, having an X-shaped flowpath, prior to splitting and exiting via the top 828 and bottom 826 disks. It will be appreciated that as a stand alone array of flowpaths an additional piece (not shown) above and below the three elements shown would be required to enclose the outlet flowpaths.

Figure 9:
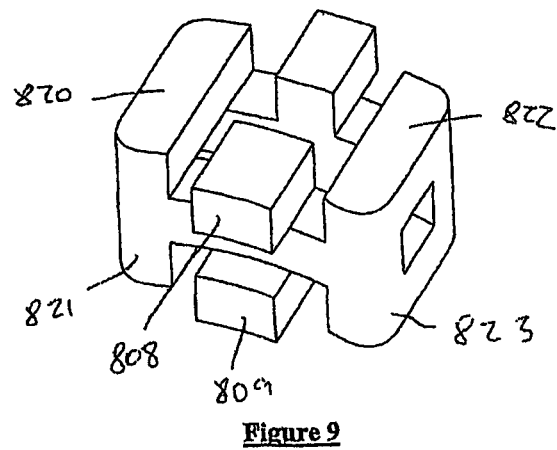
FIG. 9 shows an assembled view of the valve trim of the fourth embodiment having the flowpath shown in FIG. 5.

Referring to FIG. 9 the flowpath created by the disks of FIG. 8 is shown.

Figure 10:
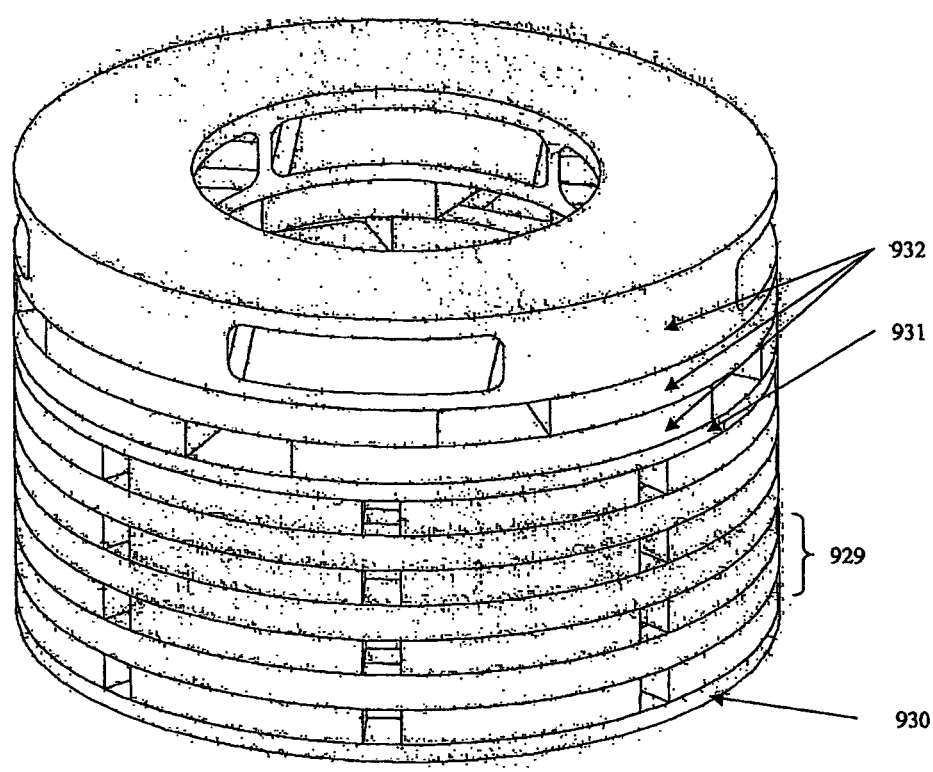
FIG. 10 shows the valve trim of the fourth embodiment fully assembled.

Referring to FIG. 10 a fully assembled valve trim 800 according to the fourth embodiment is shown being cylindrical in form and having an axial bore therethrough. A plurality of flowpaths, each having a pair of inlets passes through the trim from the outer circumferential surface to the bore surface. The trim comprises a plurality of sets of disks 929 as described in relation to FIGS. 8 and 9, which are interconnected in the vertical plane, i.e. the additional piece referred to enclose the flowpaths is omitted between the sets of three disks but is provided 930 below the lowest disk and 931 above the uppermost of the sets of three disks. A number of disks 932 with larger straight flowpaths are included at the top of the trim such that when the valve is fully open there is a larger lower resistance flowpath such that maximum flow can be achieved.

Figure 12:
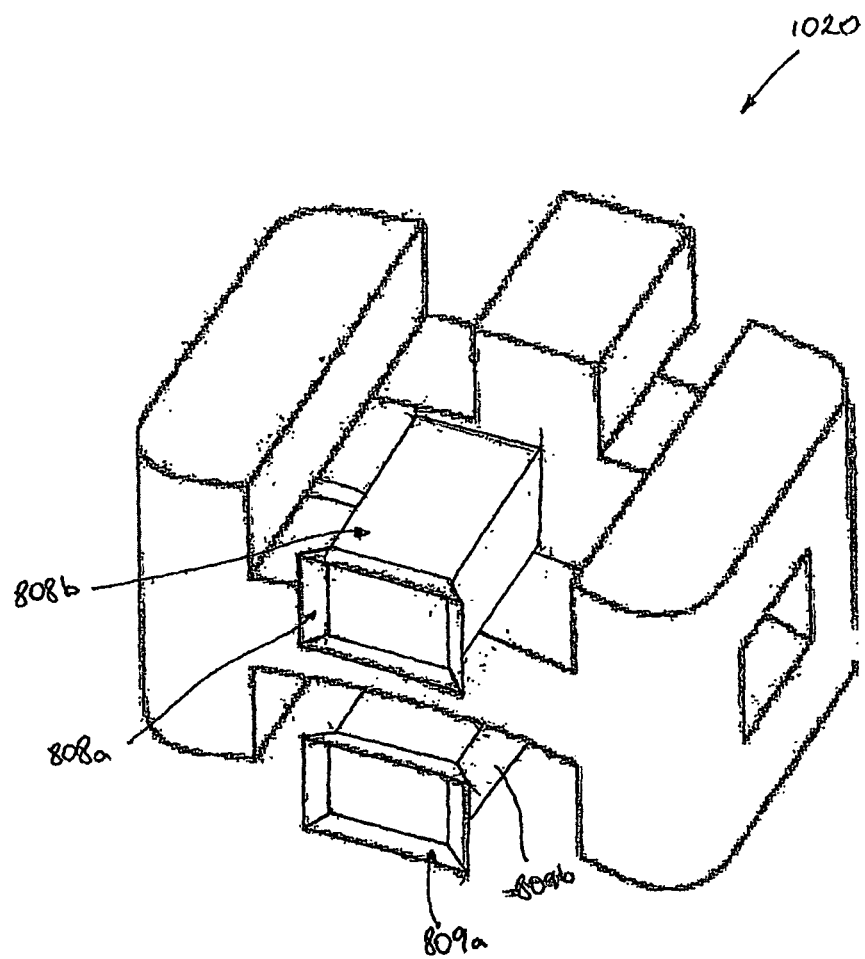
FIG. 12 is a diagrammatic illustration of the flowpath created by the valve trim of FIG. 11.

Referring to FIGS. 11, 12 and 15, a sixth embodiment of the invention provides a valve trim 1000. The valve trim 1000 of this embodiment is substantially the same as the valve trim 800 of the previous embodiment, with the following modifications. The same reference numbers are retained for corresponding features.

In this embodiment, each inlet aperture 808, 809 comprises an inlet section 808*a*, 809*a* at its fluid inlet end (as seen best in FIG. 15). The inlet section 808*a*, 809*a* tapers in cross-sectional area from the inlet end to its junction with the main section 808*b* of the inlet aperture 808, 809 and has the general shape of a truncated square pyramid. The vertical (as orientated in FIG. 11) sections 1002 of the inlet sections 808*a*, 809*a* are formed within the top disk 828 and the bottom disk 826 respectively. The top sections 1004 of the inlet sections 808*a* are formed on a solid disk 1006 stacked on top of the top disk 828. The bottom sections 1008 of the inlet sections 808*a* are formed on the upper (as orientated in FIG. 11) surface of the middle disk 827. The top sections 1010 of the inlet sections 809*a* are formed on the lower surface of the middle disk 827. The bottom sections of the inlet sections 809*a* will be provided on a further disk or a solid disk (not shown) stacked below the bottom disk 826. When the disks 826, 827, 828 and 1006 are stacked together, a fluid flow path 1020 is formed as shown in FIG. 12.

Prior art inlet apertures having sharply angled inlets, as shown in FIGS. 13 and 14, concentrate the particles to the centre of the flow. The particles (P) entrained in the fluid flowing through the flow channel have varying velocity vectors (indicated by their associated arrows). As the flow enters the aperture the velocity vectors of the particles change to eventually become aligned with the direction of flow through the main section 808*b*. The flow prior to entering the inlet apertures 808, 809 will be substantially radial (two dimensions of this are shown in FIG. 13) and once in the flow channel the flow will be substantially axial.

As the particles have a finite mass they will not immediately change direction upon entering the flow channel, the will undergo a period of transition during which their velocity vector changes. It is the transition in the vector velocities from radial to axial, and the momentum carried by the particles which causes the particles (P) within fluid (F) flowing into the inlet aperture to become concentrated towards the central region of the fluid flow, as indicated by the dashed lines in FIG. 13 and shown in the particle concentration profile (C) in FIG. 14. Because the speed of the fluid flow is also highest within the central region of the fluid flow (as shown in the flow speed profile (S) in FIG. 14), the highest concentration of particles travels with the highest speed within the fluid flow. As a result, the particles gain momentum in the main section 808*b* which, when the particles impact on the end wall of the inlet aperture, causes a high degree of corrosion of the wall, as illustrated in FIG. 13.

Referring to FIG. 15, the presence of the tapered inlet section 808*a*, 809*a* of the inlet apertures 808, 809 in the valve trim 1000 reduces the occurrence of eddies in the fluid flow at the inlet end of the inlet apertures 808, 809 and consequently minimizes the concentration of particles into the central region of the fluid flow. As a result, the corrosion of the end wall 808*c* of the inlet aperture is significantly reduced.

In an alternative arrangement, the truncated square pyramid shaped inlet sections 808a, 809a may be replaced by frusto-conical shaped inlet sections or filleted inlet sections. In a valve trim according to a seventh embodiment of the invention, the three dimensional tapered truncated inlet sections 808a, 809a are replaced by two dimensional non-rectangular shaped inlet ends; that is to say shapes which do not include the sharp, 90 degree angles of a rectangle or a square. In the flowpath 1030 shown in FIG. 16, the inlet ends 1032, 1034 take the shape of a rectangle having curved corners. The inlet ends 1032, 1034 may alternatively be generally octagonal in shape.

This shaping similarly assists in reducing the occurrence of eddies in the inlet sections of the inlet apertures.

The invention claimed is:

1. A valve trim for a pressure reduction valve containing a plurality of high hydraulic flow resistance flowpaths therethrough, each flowpath comprising at least two inlets and at least one impingement zone, said impingement zone having two zone inlets in communication with the flowpath inlets and arranged substantially 180 degrees to one another and two zone outlets substantially perpendicular to the zone inlets and the flowpath inlets such that flow entering the two zone inlets mutually impinges on itself creating an area of high energy loss, and thereafter separates and exits through the zone outlets, each flowpath extending along at least three axes and being configured such that the totality of flow into each of the flowpath inlets enters the impingement zone before separating and exiting therefrom.

2. A valve trim according to claim 1 wherein the zone inlets and outlets form an X-shaped flowpath.

3. A valve trim according to claim 2 wherein the X-shaped flowpath is perpendicular to the general direction of flow through the trim.

4. A valve trim according to claim 1 wherein the two inlets turn through 90 degrees immediately prior to a first at least one impingement zone.

5. A valve trim according to claim 1 wherein the two zone outlet flows from a first at least one impingement zone turn back on themselves through 180 degrees and impinge on each other a second time at a second impingement zone, thereby further dissipating energy.

6. A valve trim according to claim 5 wherein the second impingement zone also has an X-shaped flowpath and functions the same as the first impingement zone.

7. A valve trim according to claim 6 wherein the flowpath is repeated in series with the outlets of one zone becoming the inlets of the next.

8. A valve trim according to claim 6 wherein each outlet flow from the first zone divides into two split paths to reduce the particle velocity as it turns through 180 degrees, the split paths rejoining at a third impingement zone immediately prior to the second impingement zone, the paths impinging one another at substantially 180 degrees.

9. A valve trim according to claim 5 wherein the flow exits the trim after the second impingement zone.

10. A valve trim according to claim 9 wherein the zone outlets from the second impingement zone change direction through 90 degrees before exiting the trim.

11. A valve trim according to claim 1 wherein the plurality of flowpaths are arranged in a radial fashion around the trim with the inlets on the outside circumferential surface of the trim and the outlets on the interior surface of the bore.

12. A valve trim according to claim 11 wherein adjacent flowpaths through the trim share a common section such that the zone outlets from the first impingement zones of adjacent flowpaths impinge on one another substantially at 180 degrees at a common impingement zone having a T-shaped flowpath and exit through a common outlet thereof.

13. A valve trim according to claim 12 wherein after exiting the common impingement zone the adjacent flowpaths flow together for a short distance before splitting to flow to second impingement points of the respective adjacent flowpaths.

14. A valve trim according to claim 11 wherein adjacent flowpaths through the trim share a common section such that the zone outlets from the first impingement zones of adjacent flow paths impinge on one another substantially at 180 degrees at a common impingement zone having an X-shaped flowpath, one first zone outlet of each of said two adjacent flowpaths forming the zone inlets to the common impingement zone, and then immediately separating into two intermediate flows turning through 180 degrees to impinge upon one another at a second common impingement zone, also having an X-shaped flowpath, and then splitting to exit the second common zone to form an inlet to second impingement zones of each of the two adjacent flowpaths.

15. A valve trim according to claim 1 wherein the at least two inlets of the flowpath are at least partially tapered along their length, the cross-sectional size of the inlets reducing along the direction of the flow through the flowpaths.

16. A valve trim according to claim 1 wherein the at least two inlets of the flowpath are filleted on their inlet edges such that, in the region of the fillet, the cross-sectional size of the inlets reduces along the direction of the flow through the flowpaths.

17. A valve trim according to claim 1 wherein the valve trim comprises a plurality of flat disks, each having a plurality of apertures provided through it, each aperture forming a leg of a flowpath through the valve trim, the disks being stacked on top of one another such that the first aperture in a first disk is at least partially aligned with a first aperture on a second, adjacent disk to thereby form the flowpath through the valve trim.

18. A valve trim according to claim 17, wherein at least one aperture on at least one disk comprises an inlet aperture for receiving fluid through an inlet end into the valve trim flowpath.

19. A valve trim according to claim 18, wherein the inlet aperture comprises a tapered inlet section at its inlet end, the cross-sectional size of the inlet aperture reducing along the inlet section from the inlet end.

20. A valve trim according to claim 19, wherein the inlet section is frusto-conical in shape, giving the inlet section a curved profile at its inlet end, or is generally in the shape of a truncated square pyramid.

21. A valve trim according to claim 18, wherein the inlet end of the inlet aperture is non-rectangular in shape.

22. A valve trim according to claim 21, wherein the inlet end of the inlet aperture is generally octagonal in shape or takes the shape of a rectangle having radiussed corners.

23. A valve having a trim according to claim 1.

24. A valve trim for a pressure reduction valve containing a plurality of high hydraulic flow resistance flowpaths therethrough, each flowpath comprising at least two inlets and at least one impingement zone, said impingement zone having two zone inlets in communication with the flowpath inlets and arranged substantially 180 degrees to one another and substantially 90 degrees to the flowpath inlets, and two zone outlets substantially perpendicular to the zone inlets and substantially 90 degrees to the flowpath inlets such that flow entering the two zone inlets mutually impinges on itself creating an area of high energy loss, and thereafter separates and exits through the zone outlets, each flowpath extending along at least three axes and being configured such that the totality of flow into each of the flowpath inlets enters the impingement zone before separating and exiting therefrom.

\* \* \* \* \*